US008260795B2

(12) United States Patent
Park et al.

(10) Patent No.: US 8,260,795 B2
(45) Date of Patent: Sep. 4, 2012

(54) METHOD FOR PROVIDING MULTIMEDIA TO PROVIDE CONTENT RELATED TO KEYWORDS, AND MULTIMEDIA APPARATUS APPLYING THE SAME

(75) Inventors: Jung-chul Park, Incheon (KR);
Giang-yoon Kwon, Guri-si (KR);
Keum-koo Lee, Seongnam-si (KR);
Yong-jin So, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 496 days.

(21) Appl. No.: 12/103,738

(22) Filed: Apr. 16, 2008

(65) Prior Publication Data
US 2009/0150379 A1    Jun. 11, 2009

(30) Foreign Application Priority Data
Dec. 7, 2007  (KR) .................. 10-2007-0127023

(51) Int. Cl.
*G06F 17/30* (2006.01)
*H04B 1/18* (2006.01)

(52) U.S. Cl. .................... 707/758; 455/186.1

(58) Field of Classification Search .............. None
See application file for complete search history.

(56) References Cited

U.S. PATENT DOCUMENTS

| 7,657,526 | B2* | 2/2010 | Aravamudan et al. | 707/750 |
| 7,865,498 | B2* | 1/2011 | Rodriguez | 707/711 |
| 2003/0179320 | A1* | 9/2003 | Kim | 348/732 |
| 2004/0123319 | A1* | 6/2004 | Kim | 725/53 |
| 2007/0039023 | A1* | 2/2007 | Kataoka | 725/46 |
| 2007/0244902 | A1* | 10/2007 | Seide et al. | 707/10 |
| 2008/0282311 | A1* | 11/2008 | Kikinis et al. | 725/131 |
| 2009/0217168 | A1* | 8/2009 | Dexter et al. | 715/731 |

FOREIGN PATENT DOCUMENTS

| KR | 2006-21485 | 3/2006 |
| KR | 2007-75529 | 7/2007 |

* cited by examiner

*Primary Examiner* — Tarek Chbouki
(74) *Attorney, Agent, or Firm* — Jefferson IP Law, LLP

(57) ABSTRACT

A method for providing multimedia and a multimedia apparatus applying the same. The method for providing multimedia includes searching for content related to keywords and generating channels to provide the content found as a result of searching. Therefore, it is possible for a user to more conveniently use Internet multimedia content using a TV.

23 Claims, 10 Drawing Sheets

METHOD FOR PROVIDING MULTIMEDIA TO PROVIDE CONTENT RELATED TO KEYWORDS, AND MULTIMEDIA APPARATUS APPLYING THE SAME

CROSS-REFERENCE TO RELATED APPLICATION

This application claims the benefit of Korean Application No. 2007-127023, filed in the Korean Intellectual Property Office on Dec. 7, 2007, the disclosure of which is incorporated herein by reference.

BACKGROUND OF THE INVENTION

1. Field of the Invention

Aspects of the present invention relate to a method for providing multimedia and a multimedia apparatus applying the method, and more particularly, to a method of providing multimedia and a multimedia apparatus applying the method to provide multimedia content using the Internet.

2. Description of the Related Art

Technological development has enabled a single electronic product to have a wide range of functions, so multifunctional electronic products providing increased convenience and functionality have been introduced. Technologies for adding Internet functions to electronic products have become widespread as a result of the development of network infra structure and the popularization of Internet communication. Accordingly, multifunctional electronic products, such as televisions (TVs), refrigerators and microwave ovens, have come to be provided with access to the Internet.

Among such multifunctional electronic products, TVs are also able to access Internet networks using relay devices of settop boxes. Recently, Internet TV services in which TVs connected to Internet networks to enable users to view image content contained on the Internet have become widely used. Accordingly, Internet TV services may be provided to users, so users are able to view multimedia content stored in servers of Internet TV providers on their TVs.

Users may be provided with a wide variety of multimedia content using TVs capable of supporting Internet services. However, in order to view desired content, users need to search for a wide variety of Internet content separately, which causes inconvenience. Thus, there is a need for methods by which users may use Internet multimedia content via TVs more conveniently.

SUMMARY OF THE INVENTION

Aspects of the present invention relate to a method for providing multimedia whereby content related to keywords is able to be provided so that a user can use Internet multimedia content via a TV more conveniently, and to a multimedia apparatus applying the same.

According to an aspect of the present invention, a method for providing multimedia is provided. The method includes storing keywords previously input by a user; generating a channel to provide content related to the stored keywords; and searching for the content related to the stored keywords from a built-in storage medium or an external apparatus.

According to another aspect of the present invention, the method further includes, if the channel is selected by the user, playing back on a display one of the content found as a result of the searching.

According to another aspect of the present invention, the method further includes, if the channel is selected by the user, displaying on a screen a list of the f content found as a result of the searching.

According to another aspect of the present invention, the searching further includes periodically searching for the content related to the stored keywords from a built-in storage medium or an external apparatus, and updating the channel using the content found as a result of the periodic search.

According to another aspect of the present invention, the method further includes, if new content is found as a result of the searching, generating a notification message stating that the new content has been found.

According to another aspect of the present invention, the method further includes, displaying a channel list in which the channel is listed together with a broadcast channel.

According to another aspect of the present invention, the method further includes assigning a channel number not used as a broadcast channel number to the channel.

According to another aspect of the present invention, the keywords include a search expression, and the method further includes setting a name of the channel to be a name having a predetermined relationship with the search expression.

According to another aspect of the present invention, the method further includes receiving a user selection of a type of a search engine. The searching may include searching for the content related to the stored keywords from a built-in storage medium or an external apparatus using the selected search engine.

According to another aspect of the present invention, the content is at least one of video, music, photographs, and/or text.

According to another aspect of the present invention, a multimedia apparatus is provided. The multimedia apparatus includes a storage unit to store keywords previously input by a user and content, and a controller to generate a channel to provide content related to the stored keywords, and to search for the content related to the stored keywords from the storage unit or an external apparatus.

According to another aspect of the present invention, if the channel is selected by the user, the controller controls one of the content found as a result of the search to be played back on a display.

According to another aspect of the present invention, if the channel is selected by the user, the controller controls a list of the content found as a result of the search to be displayed on a screen.

According to another aspect of the present invention, the controller periodically searches for the content related to the stored keywords from the storage unit or an external apparatus, and may update the channel using the content found as a result of the periodic search.

According to another aspect of the present invention, if new content is found as a result of the search, the controller generates a notification message stating that the new content has been found.

According to another aspect of the present invention, the controller displays a channel list in which the channel is listed together with a broadcast channel.

According to another aspect of the present invention, the controller assigns a channel number not used as a broadcast channel number to the channel.

According to another aspect of the present invention, the keywords include a search expression, and the controller sets a name of the channel to be a name having a predetermined relationship with the search expression.

According to another aspect of the present invention, the controller searches for the content related to the stored keywords from the storage unit or an external apparatus using a search engine selected by the user.

According to another aspect of the present invention, the content is at least one of video, music, photographs, and/or text.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
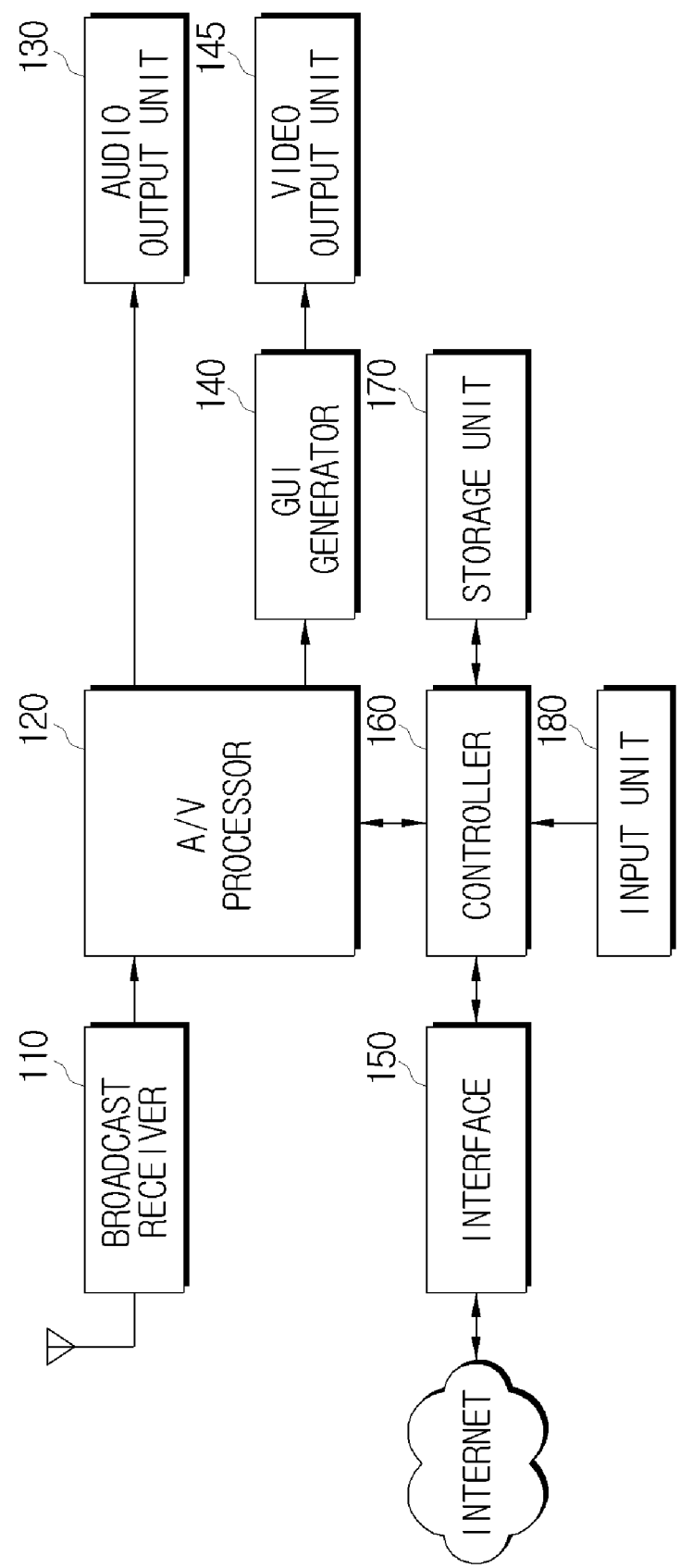
FIG. 1 is a block diagram of a TV according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a TV according to an embodiment of the present invention. The TV of FIG. 1 includes a broadcast receiver 110, an audio/video (A/V) processor 120, an audio output unit 130, a graphical user interface (GUI) generator 140, a video output unit 145, an interface 150, a controller 160, a storage unit 170 and an input unit 180. According to other aspects of the present invention, the TV may include additional and/or different units. Similarly, the functionality of two or more of the above units may be integrated into a single component.

The broadcast receiver 110 receives a broadcast from a broadcast station or a satellite via a cable or wirelessly, and demodulates the received broadcast. The A/V processor 120 performs signal processing, such as video decoding, video scaling, audio decoding, or the like, with respect to video and audio signals output from the broadcast receiver 110. Additionally, the A/V processor 120 transmits the video signals and the audio signals to the GUI generator 140 and the audio output unit 130, respectively. If the video and audio signals are stored in the storage unit 170, or transmitted to an external device via the interface 150, the A/V processor 120 outputs the video and audio signals in compressed format to the storage unit 170 or to the interface 150.

The audio output unit 130 may output audio signals transmitted from the A/V processor 120 through a speaker, or may output audio signals to an external device (for example, an external speaker) connected through an external output terminal.

The GUI generator 140 generates a GUI to be provided to a user. The GUI generator 140 generates a GUI to configure an electronic program guide (EPG) screen using received additional information, and adds the generated GUI to video output from the A/V processor 120. The GUI generator 140 may also generate a GUI used to generate channels, select channels or select content obtained by a search.

The video output unit 145 may display the video output from the A/V processor 120 on a display, or may output the video to an external device (for example, an external display) which is connected through an external output terminal.

The interface 150 connects the TV to the Internet. The interface 150 connects the controller 160 to the Internet so that the controller 160 may search for content on the Internet.

The storage unit 170 stores content received by the broadcast receiver 110 or content downloaded via the interface 150. Additionally, the storage unit 170 may output video and audio stored therein to the A/V processor 120. The storage unit 170 may be a hard disc drive (HDD) or a nonvolatile memory. Furthermore, the storage unit 170 stores setting values of channels (hereinafter, referred to as search channels), which provide content found as a result of searching using keywords generated by the user. For example, the storage unit 170 may store search channel names, search channel numbers, and keywords and search expressions associated with the search channels. The storage unit 170 may also store viewing record information, which may be needed to exclude content which the user was viewing previously.

The input unit 180 receives user operation information and transmits the user operation information to the controller 160. According to some aspects of the present invention, the user may generate search channels and select one or more of the generated search channels, using the input unit 180.

The controller 160 checks user commands based on the user operation information received from the input unit 180, and controls the entire operation of the TV according to the user commands. Additionally, the controller 160 generates search channels to provide content related to the keywords stored in the storage unit 170, and searches for the content related to the keywords stored in the storage unit 170 or content stored on the Internet.

The controller 160 periodically searches for content related to the keywords stored in the storage unit 170, and periodically updates content provided by the search channels. If new content is obtained by the searching operation, the controller

160 may generate and display a notification message stating that new content has been found by the search.

Figure 2:
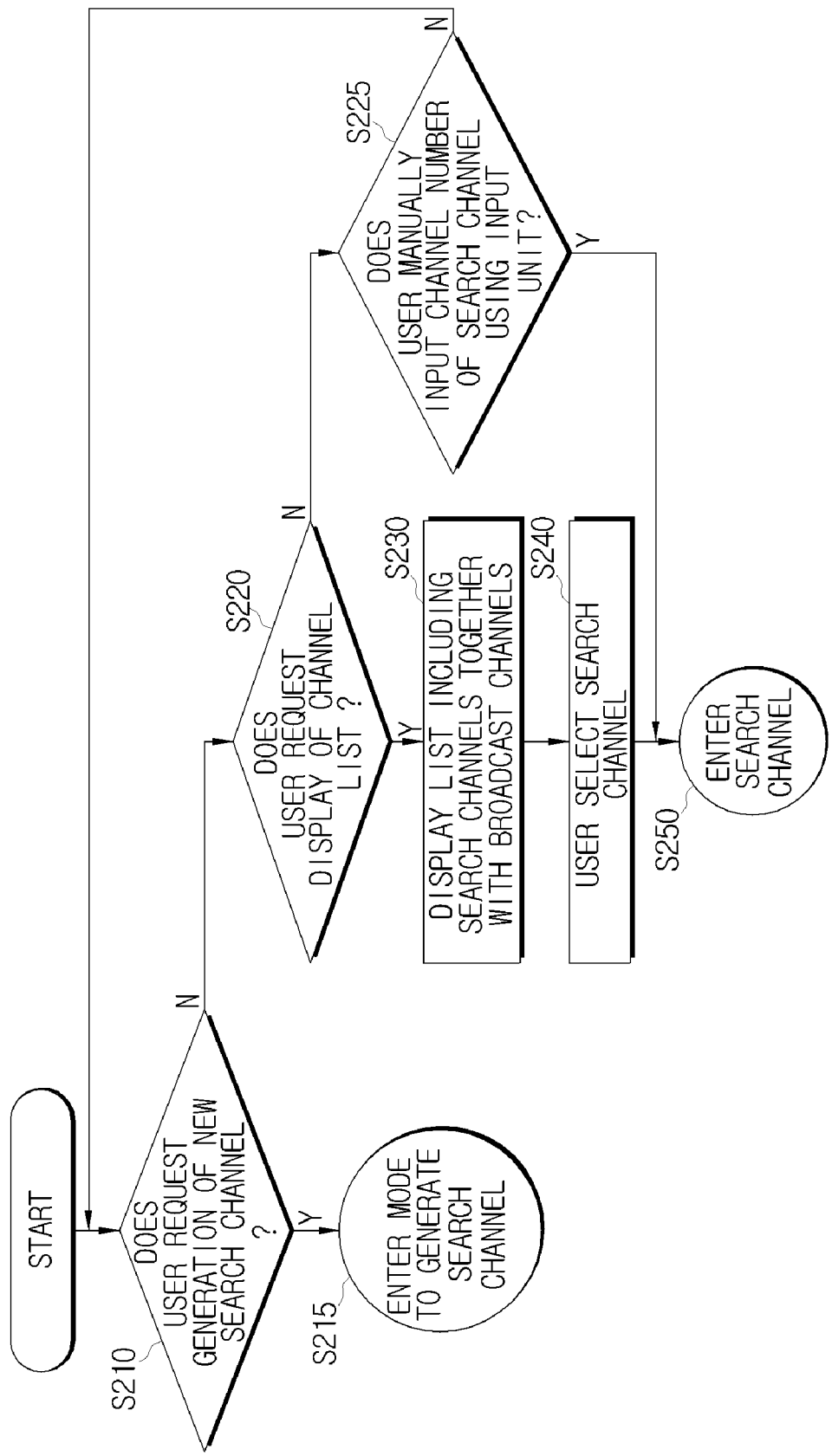
FIG. 2 is a flowchart of a process of generating and entering a search channel, according to an embodiment of the present invention.

The operations of the controller 160 to provide the search channels will be described in detail with reference to FIG. 2. FIG. 2 is a flowchart of a process of generating and entering a search channel, according to an embodiment of the present invention. The controller 160 determines whether the user requests generation of a new search channel in operation S210. If the user requests generation of a new search channel, the controller 160 enters a mode to generate a search channel in operation S215. This process of generating a search channel will be described in more detail with reference to FIG. 3.

If the user does not request generation of a new search channel, the controller 160 determines whether the user requests display of a channel list in operation S220. If the user requests display of the channel list, the controller 160 displays a list in which the search channels are listed together with broadcast channels in operation S230.

If the user selects a specific search channel from the displayed list in operation S240, the controller 160 controls the TV to display the selected search channel in operation S250. Operation S250, namely the process of entering the search channel, will be described in detail with reference to FIG. 4. If the user manually inputs a channel number of a search channel using the input unit 180, the controller 160 controls the TV to display a search channel corresponding to the input channel number in operation S250.

Figure 3:
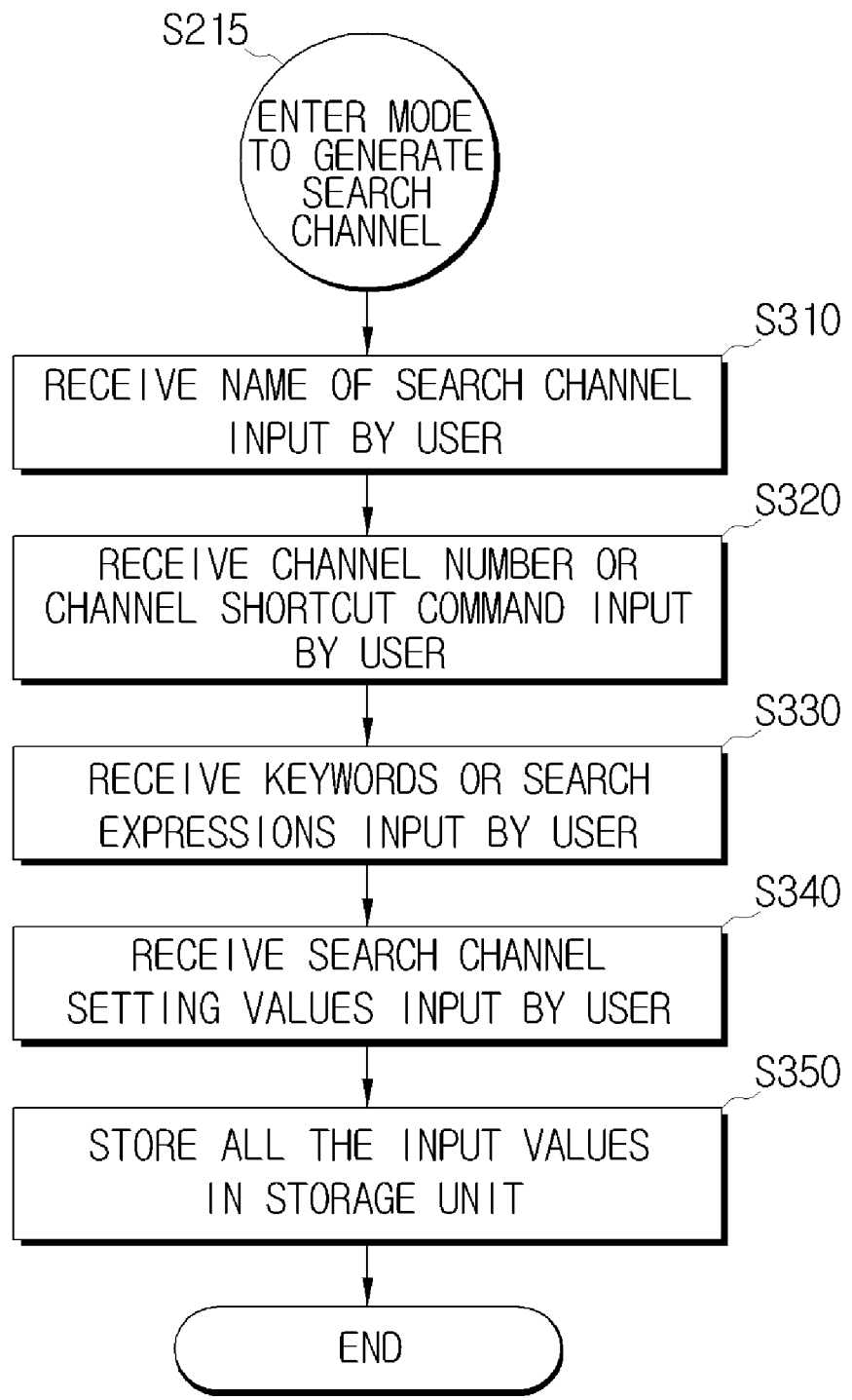
FIG. 3 is a flowchart of the process of generating a search channel, according to an embodiment of the present invention.

The process of generating a search channel will be described in detail with reference to FIGS. 3 and 5. FIG. 3 is a flowchart of the process of generating a search channel, according to an embodiment of the present invention. If the user requests generation of a new search channel in operation S215, the controller 160 receives a name of a search channel input by the user in operation S310. The name of the search channel may be input and set by the user. Additionally, according to the control of the controller 160, the name of the search channel may be caused to be automatically set as a name related to a search expression or keywords. For example, if a search expression is "Ji-Sung PARK+Soccer", the controller 160 may set the name of the search channel to be "Ji-Sung PARK".

The controller 160 may then receive a channel number or a channel shortcut command input by the user, in operation S320. The channel number of the search channel may be one from among available channel numbers, excluding numbers used as broadcast channel numbers. For example, if 9 is assigned to a channel KBS and if 11 is assigned to a channel MBC, 10 may be assigned to the search channel.

The channel shortcut command is used for convenient access to channels using a remote controller. For example, in order to input the channel shortcut command, the user may press a certain number button for a long period of time, or may press a combination of two or more digits, or may press an initial sound of the channel name or initials of the channel name.

If the channel number or the channel shortcut command input by the user overlaps with previously input information, the controller 160 may display a notification message stating that the input channel number or the input channel shortcut command already exists, and may then control the TV to receive another channel number or another channel shortcut command.

The controller 160 receives keywords or a search expression input by the user in operation S330. The keywords refer to terms that the user desires to search for, and the search expression refers to a combination of keywords and numerical formulae in order to perform a search in wide various manners. For example, "+" may indicate "or"; "−" may indicate "exception"; and "*" may indicate "and". If a search expression "Ji-Sung PARK+Soccer−Cheon-Soo LEE" is input, the controller 160 may search for content which includes the keywords "Ji-Sung PARK" or "Soccer", but excludes the keyword "Cheon-Soo LEE".

Subsequently, the controller 160 receives search channel setting values other than the search channel names, search channel numbers, keywords, and search expressions, in operation S340. The search channel setting values may be used to select the types of search web sites, the content arrangement order, the display format or a notification setting set to "On" or "Off".

The search web site includes a search engine selected by the controller 160 to perform a search using keywords. The controller 160 may use search web sites stored in the storage unit 170 or search web sites provided over the Internet, such as yahoo.com, naver.com, or google.com.

The content arrangement order indicates the order in which search-related content is arranged. The controller 160 may cause a variety of content obtained by search to be arranged according to the time the content is registered or according to the popularity of the content in order to be displayed on a screen.

The display format refers to a method for displaying a list of search-related content. The display format includes a list format or a thumbnail format. The list format is used to display only content names in the form of a list, and the thumbnail format is used to display thumbnails indicating the search-related content together with a list of the search-related content.

The notification setting is used to determine whether to notify a user that new content is found. In a mode in which notification is set to "On", if new content is found while periodically searching for search-related content using keywords, the controller 160 may cause a notification message stating that new content has been found to be displayed on the screen.

If the user inputs all the search channel setting values, the controller 160 may store the input search channel setting values in the storage unit 170, in operation S350. The stored search channel setting values may be used when search channels are displayed.

Figure 5:
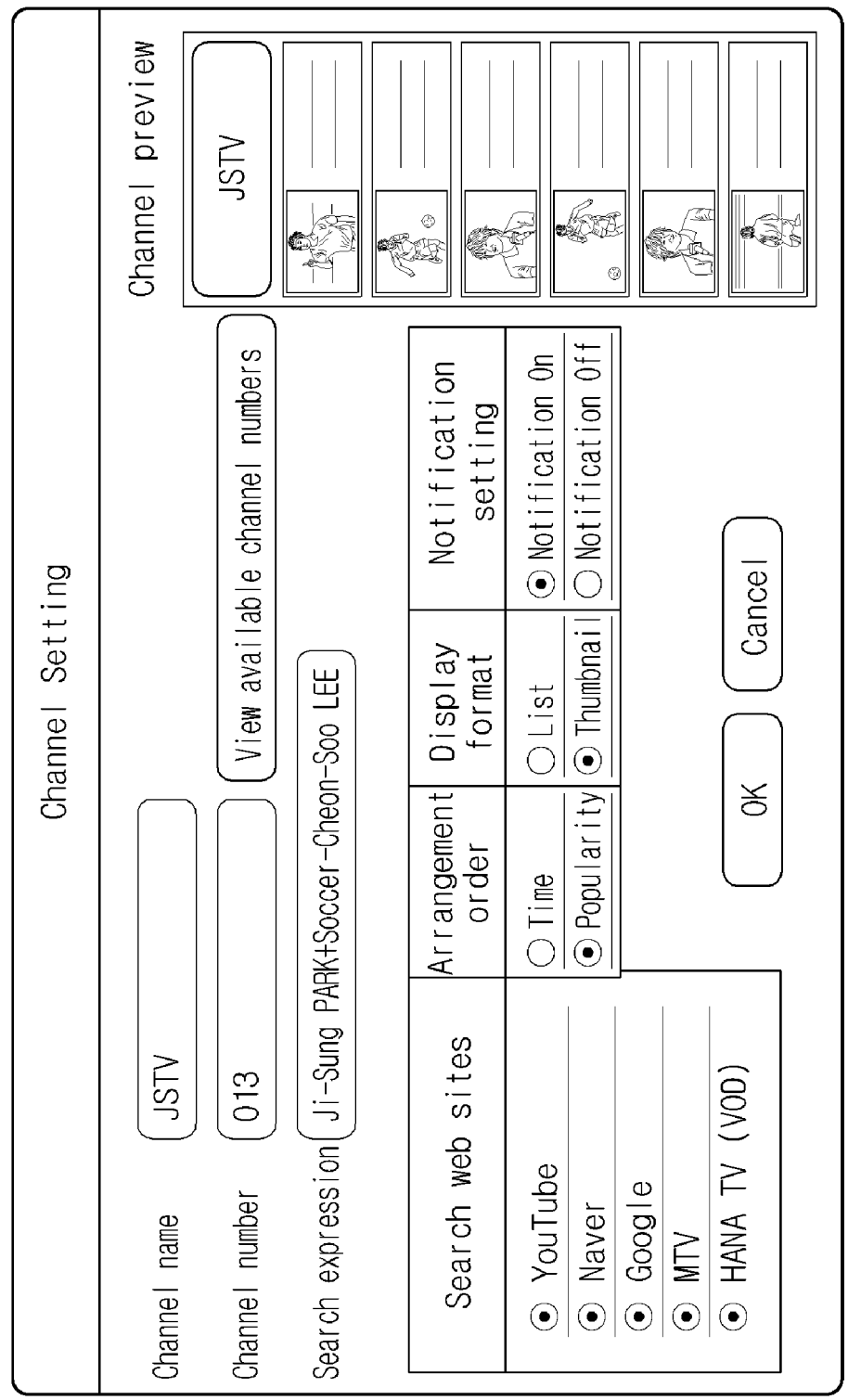
FIG. 5 illustrates a search channel setting screen according to an embodiment of the present invention.

FIG. 5 shows a search channel setting screen through which the user is able to set search channels, according to an exemplary embodiment of the present invention. The search channel setting screen includes a channel name setting area, a channel number setting area, a search expression setting area, a channel preview area, a search web site selection area, an arrangement order selection area, a display format selection area, and a notification setting selection area.

For example, the search channel name, search channel number and search expression may be set to be "JSTV", "13" and "Ji-Sung PARK+Manu−Cheon-Soo LEE", respectively, on the search channel setting screen of FIG. 5. Additionally, youtube.com, yahoo.com, naver.com, google.com and HANA TV (VOD) may be selected on the search channel setting screen of FIG. 5. Furthermore, the channels may be arranged as thumbnail images in order of popularity, and notification may be set to "On", as shown in FIG. 5.

If the user clicks on an available channel number view area, available channel numbers, which are not used as broadcast channel numbers, may be shown, so that the user can check the available channel numbers. Additionally, the user may know in advance content obtained by search through the channel preview area.

Figure 4:
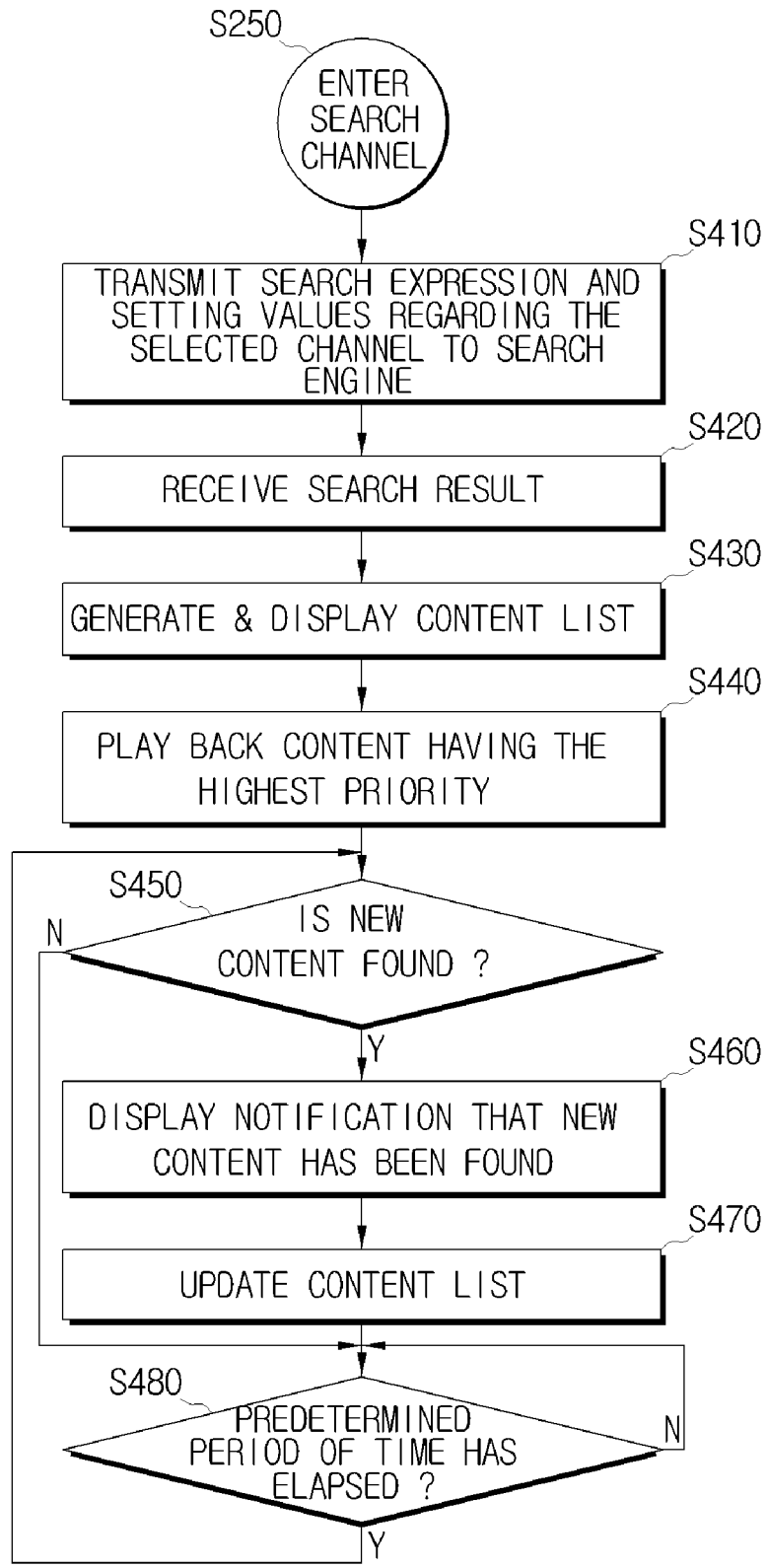
FIG. 4 is a flowchart of the process of entering a search channel, according to an embodiment of the present invention.
Figure 6:
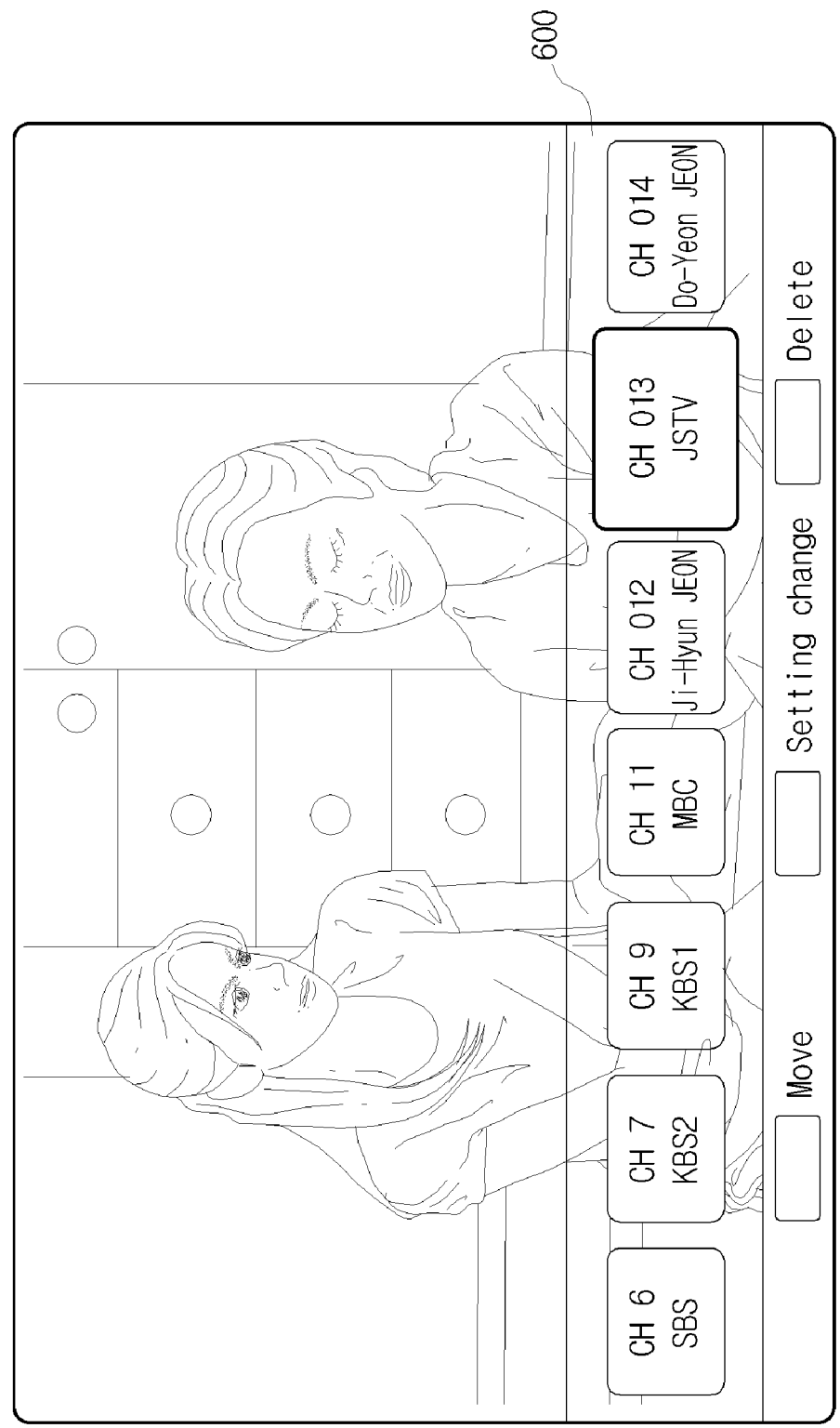
FIG. 6 illustrates a channel selection screen according to an embodiment of the present invention.

The process of entering the search channel when the search channel is selected will be described in detail with reference to FIGS. 4, 6 and 10. FIG. 4 is a flowchart of the process of entering a search channel, according to an embodiment of the present invention.

The controller 160 transmits a search expression and setting values regarding the selected channel to a search engine on the Internet in operation S410. The search expression and setting values regarding the selected channel are stored in the storage unit 170. The controller 160 then searches for content using a search engine of the search web site selected by the user or using the search engine stored in the storage unit 170.

The controller 160 receives a search result in operation S420. The search result is received in metadata format of search-related content or in multimedia files of content. The metadata includes information on the title, the size, the manufacturer, or a uniform resource locator (URL) regarding the search-related content.

The controller 160 generates a content list containing content obtained as the search result, and displays the generated content list on the screen, in operation S430. In this situation, the controller 160 may control the content list to be displayed in a list format or thumbnail format. The list format may be determined according to the user's setting values.

The controller 160 may arrange the content list in various orders, for example, in order of time, relevance to the search result, users' evaluation, or popularity. The controller 160 may also generate a content list in which content is listed according to the users' demands. Additionally, if duplicate content is found during generation of the content list, the controller 160 may delete all but one of the duplicate content except for one item.

The controller 160 may compare viewing record information to the search result, and delete content that the user was viewing previously. The viewing record information is stored in the storage unit 170 and may be updated every time the user views content.

In operation S440, the controller 160 plays back on the screen content having the highest priority from among the content obtained by search. The priority may be determined in various ways. For example, the controller 160 may determine the priority of content obtained by search in order of time, relevance to the search result, users' evaluation or popularity. The priority of content may be identical to or different from the arrangement order of the content list.

The controller 160 attempts to search for content using the same keywords again in order to check whether new content exists in operation S450. If new content is found, the controller 160 may display a notification message stating that new content has been found in operation S460. However, if the user sets the notification to "Off", no message may be displayed. The controller 160 then updates the content list so as to include the new content found by the search in operation S470.

The controller 160 determines whether a predetermined period of time has elapsed in operation S480. If the predetermined period of time has elapsed, the controller 160 may attempt to search for content again in order to check for new content. Accordingly, the controller 160 may periodically search for content related to keywords or search expressions using the process described above.

When playback of currently played back content has finished, the controller 160 may play back content following the currently played back content according to the arrangement order of the list. Additionally, when the user selects additional content during playback of the currently played back content, the controller 160 may cause the selected content to be played back, instead of the currently played back content. Therefore, the user may use content contained in his field of interest in the form of a channel, by inputting keywords or search expressions.

Hereinafter, the configuration of a screen displayed during the channel entering process will be described in detail with reference to FIGS. 6 to 10. FIG. 6 shows a channel selection screen according to an embodiment of the present invention. According to other aspects of the present invention, the selection screen may be arranged differently. As shown in FIG. 6, the controller 160 may control channels to be displayed on a channel display bar 600 on the bottom of the screen. Additionally, the user may select channels using directional keys of a remote controller.

The channel display bar 600 displays channel numbers and channel names, for example broadcast channels, such as CH 6 (SBS), CH 7 (KBS2), CH 9 (KBS1) and CH 11 (MBC), and search channels, such as CH 12 (Ji-Hyun JEON), CH 13 (JSTV) and CH 14 (Do-Yeon JEON). Accordingly, the user may select the search channels in the same manner as when selecting general channels. Additionally, the user may input a channel number using the remote controller to select a channel corresponding to the channel number. For example, if the user inputs channel 13 using the remote controller, a search channel "JSTV" corresponding to channel 13 may be displayed on the screen.

Figure 7:
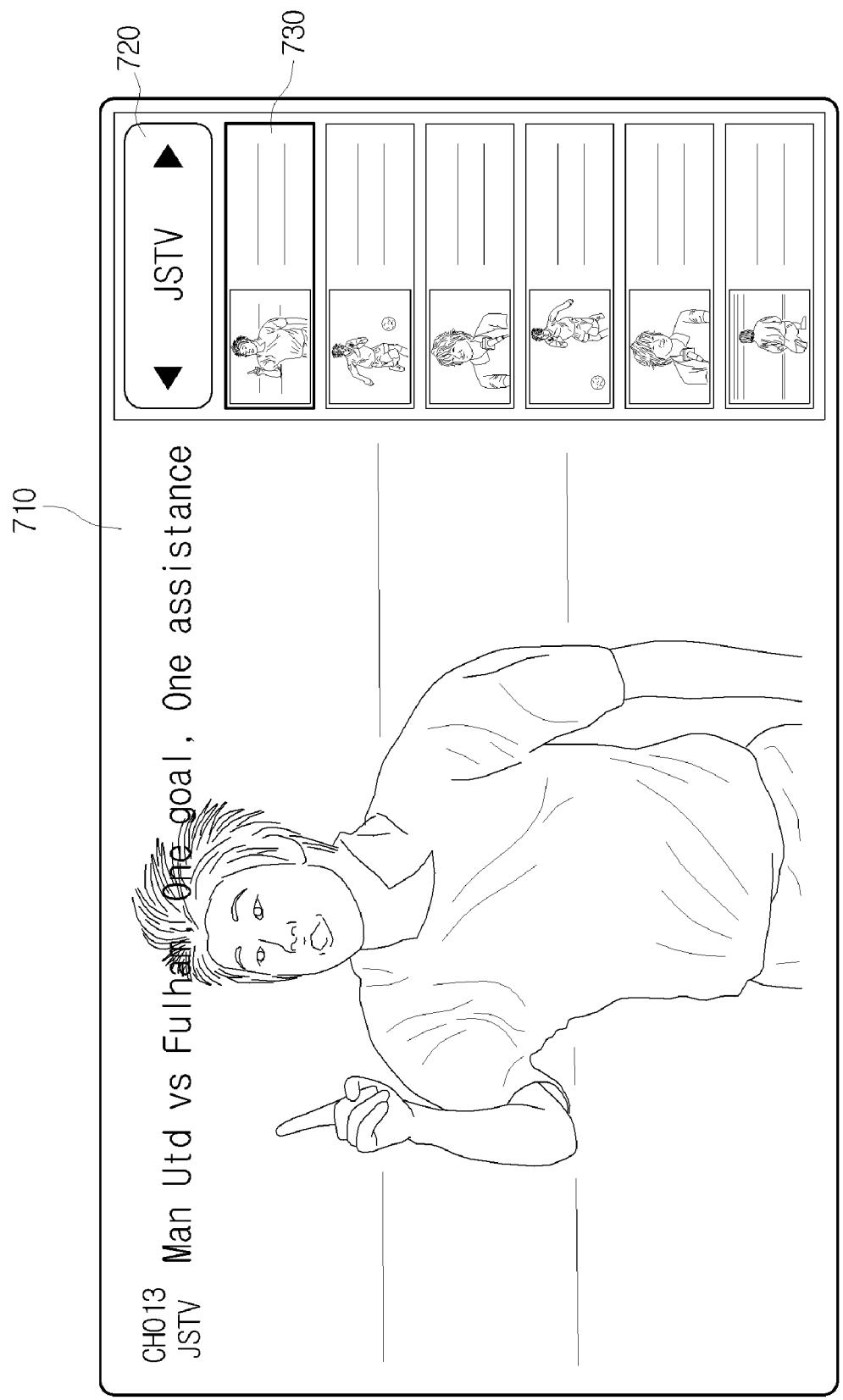
FIG. 7 illustrates a screen displayed when a search channel "JSTV" is selected, according to an embodiment of the present invention.

FIG. 7 shows a screen displayed when the search channel "JSTV" is selected, according to an embodiment of the present invention. The screen of FIG. 7 includes a content display area 710, a current channel name display area 720, and a content list display area 730. The content display area 710 displays content having the highest priority.

Figure 8:
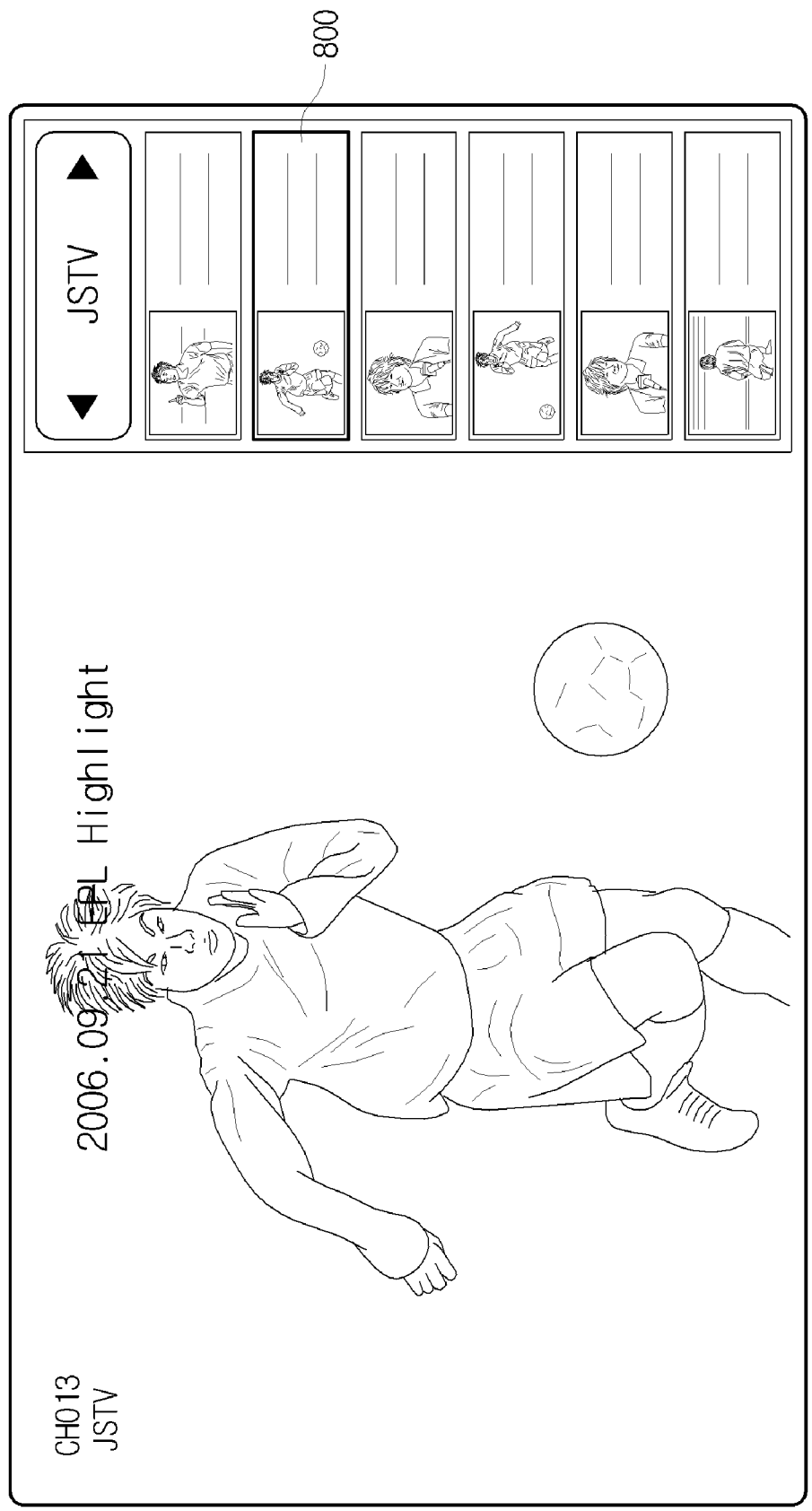
FIG. 8 illustrates a screen displayed when a user presses a down directional key of a remote controller while viewing the screen of FIG. 7, according to an embodiment of the present invention.

FIG. 8 shows a screen displayed when the user presses a down directional key of the remote controller while viewing the screen of FIG. 7, according to an embodiment of the present invention. If the user presses the down directional key of the remote controller, content 800 following currently displayed content may be displayed according to the content list order. Accordingly, up and down directional keys of the remote controller may be used to select content from the list of content provided by the selected search channels.

Figure 9:
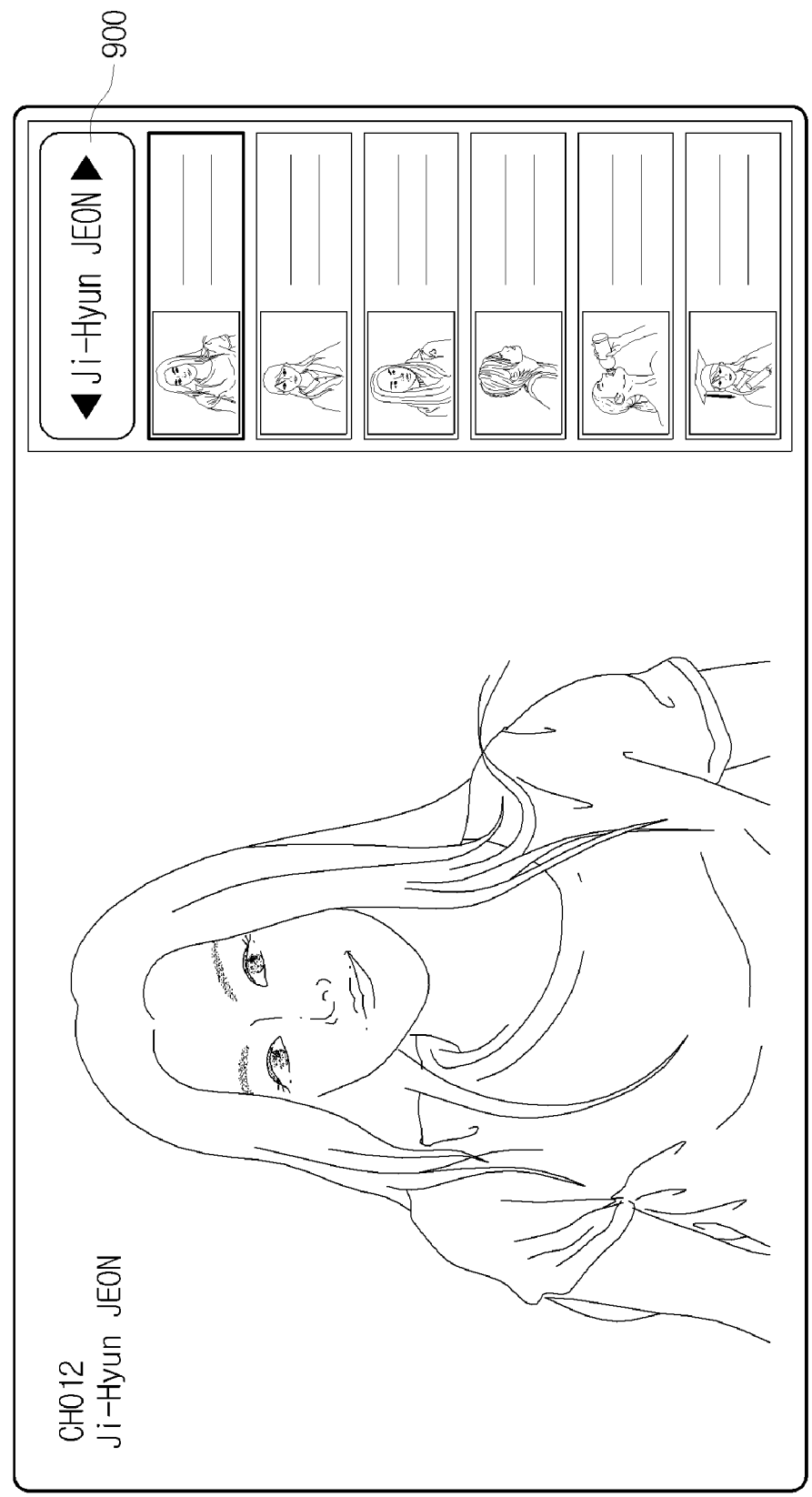
FIG. 9 illustrates a screen displayed when a user presses a left directional key of a remote controller while viewing the screen of FIG. 7, according to an embodiment of the present invention.

FIG. 9 shows a screen displayed when the user presses a left directional key of the remote controller while viewing the screen of FIG. 7, according to an embodiment of the present invention. If the user presses the left directional key of the remote controller, a current channel may be changed to a search channel "Ji-Hyun JEON" corresponding to channel 12, as shown in a current channel name display area 900 of FIG. 9. Accordingly, right and left directional keys of the remote controller may be used to select channels.

Figure 10:
FIG. 10 illustrates a screen displayed together with a notification message stating that a new moving image has been found by searching, according to an embodiment of the present invention.

FIG. 10 shows a screen displayed together with a notification message stating that a new moving image has been found, according to an embodiment of the present invention. If a new moving image is found, a notification 1000 may be displayed on the bottom right of the screen, as shown in FIG. 10. The notification 1000 includes a name of a channel which provides the new moving image, and the title of the new moving image. Accordingly, the user may more rapidly and conveniently use content contained in his field of interest by checking the notification 1000. Therefore, it is possible for the user to use search channels which provide content obtained by a search using desired keywords, on the screen configured above.

Although, as described above, the user manually inputs keywords, keywords may be input in other ways. Accordingly, the user may select additional information displayed on the screen using the remote controller to input desired keywords. For example, if a word "Ji-Sung PARK" is displayed on the screen, the user may select the word "Ji-Sung PARK" using the remote controller, so that "Ji-Sung PARK" may be set as a keyword.

The content may be video, music, photographs, text or the like. Furthermore, the TV is used as a multimedia apparatus as described above, but multimedia apparatuses other than the TV may be used. Accordingly, aspects of the present invention are also applicable to any multimedia apparatus capable of providing multimedia content using the Internet.

Moreover, it is possible to use content on communication networks other than the Internet. Aspects of the present invention are also applicable to any communication network in which multimedia content is stored.

According to aspects of the present invention, it is possible to provide content related to keywords, so the user may more conveniently use multimedia content on the Internet using the TV. Channels may be generated to provide content related to keywords and the channels may thus provide content found by a search. Accordingly, it is possible to provide a user with content contained in a user's field of interest more conveniently.

Additionally, keywords that have been input may be stored, and a search and updating may be periodically performed using the stored keywords, so there is no need for a user to repeatedly input keywords to search for content contained in his field of interest. Furthermore, when new content is found by a search, a notification message stating that the new content has been found may be displayed, and it is thus possible to provide the user with content contained his field of interest more rapidly.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer-implemented method for providing multimedia, the method comprising:
storing keywords previously input by a user;
receiving a user selection of a search engine;
generating a search channel to provide content related to the stored keywords, the search channel defined according to the stored keywords and the selected search engine;
assigning a channel number not assigned to any of at least one broadcast channels to the search channel;
when the user requests the display of a channel list, displaying the channel list as a combined channel list including both the search channel and the at least one broadcast channel, the channel list displaying both the search channel and the at least one broadcast channel in a common layout; and
searching for the content related to the stored keywords from a built-in storage medium or an external apparatus using the selected search engine.

2. The method of claim 1, further comprising:
when the search channel is selected by the user, playing back on a display one of the content found as a result of the searching.

3. The method of claim 1, further comprising:
when the search channel is selected by the user, displaying on a screen a list of the content found as a result of the searching.

4. The method of claim 1, wherein the searching further comprises:
periodically searching for the content related to the stored keywords from a built-in storage medium or an external apparatus; and
updating the search channel using the content found as a result of the periodic search.

5. The method of claim 4, further comprising:
if new content is found as a result of the searching, generating a notification message stating that the new content has been found.

6. The method of claim 1, wherein:
the keywords comprise a search expression; and
the method further comprises setting a name of the search channel to be a name having a predetermined relationship with the search expression.

7. The method of claim 1, wherein the content is at least one of video, music, photographs, and/or text.

8. A multimedia apparatus comprising:
a storage unit to store keywords previously input by a user and content; and
a controller to search for the content related to the stored keywords from the storage unit or an external apparatus using a search engine selected by the user, to generate a search channel to provide content related to the stored keywords, to assign a channel number not assigned to any of at least one broadcast channels to the search channel, and, when the user requests the display of a channel list, to display the channel as a combined channel list including both the search channel and at least one broadcast channel, the channel list displaying both the search channel and the at least one broadcast channel in a common layout,
wherein the search channel is defined according to the stored keywords and the selected search engine.

9. The multimedia apparatus of claim 8, wherein, when the search channel is selected by the user, the controller controls one of the content found as a result of the search to be played back on a display.

10. The multimedia apparatus of claim 8, wherein, when the search channel is selected by the user, the controller controls a list of the content found as a result of the search to be displayed on a screen.

11. The multimedia apparatus of claim 8, wherein the controller periodically searches for the content related to the stored keywords from the storage unit or an external apparatus, and updates the search channel using the content found as a result of the periodic search.

12. The multimedia apparatus of claim 11, wherein, if new content is found as a result of the search, the controller generates a notification message stating that the new content has been found.

13. The multimedia apparatus of claim 8, wherein:
the keywords comprise a search expression; and
the controller sets a name of the search channel to be a name having a predetermined relationship with the search expression.

14. The multimedia apparatus of claim 8, wherein the content is at least one of video, music, photographs, and/or text.

15. A computer-implemented method of providing content to a user, the method comprising:
generating a search channel to provide content related to stored keywords previously input by the user, the search channel being defined according to the stored keywords and a search engine selected by the user;
assigning a channel number not assigned to any of at least one broadcast channels to the search channel;

searching for the content related to the stored keywords from a built-in storage medium or an external apparatus using the search engine selected by the user; and displaying the search channel providing content found by the search as a combined channel list including both the search channel and the at least one broadcast channel, the channel list displaying both the search channel and the at least one broadcast channel in a common layout.

16. The method of claim 15, wherein:

the searching for the content occurs at periodic intervals; and the method further comprises updating the search channel when the search for the content results in new content being found.

17. The method of claim 15, wherein the generating of the search channel comprises:

assigning a name to the search channel based on input from a user;

assigning a number or a channel shortcut command to the search channel based on input from the user;

assigning a keyword or a search expression to the search channel based on input from the user;

storing the assigned values; and generating the search channel based on the stored assigned values.

18. The method of claim 17, wherein the displaying of the search channel comprises:

generating a content list;

displaying the content list on the search channel; and reproducing the content having a highest priority value of the content displayed on the search channel.

19. A multimedia apparatus comprising:

a storage unit to store content and keywords; and a controller to generate a search channel to provide content related to the keywords, to search for the content related to the keywords in the storage unit or on a network using a search engine selected by the user, to assign a channel number not assigned to any of at least one broadcast channels to the search channel, and to display a channel list as a combined channel list, the channel list displaying both the search channel and broadcast channels in a common layout wherein the search channel is defined according to the keywords and the selected search engine.

20. The multimedia apparatus of claim 19, wherein the controller displays a list of the content found by the search on the search channel.

21. The multimedia apparatus of claim 20, wherein the list is sorted by popularity of the content.

22. The multimedia apparatus of claim 20, wherein the list is sorted by relevance to the search.

23. The multimedia apparatus of claim 20, wherein the list is sorted based on the user's evaluation.

* * * * *